United States Patent [19]
Walsh et al.

[11] Patent Number: 4,998,202
[45] Date of Patent: Mar. 5, 1991

[54] HELICOPTER, HIGH ROTOR LOAD SPEED ENHANCEMENT

[75] Inventors: David M. Walsh; Charles E. Greenberg, both of Jupiter, Fla.; Nicholas D. Lappos, Orange, Conn.; David H. Sweet, Tequesta, Fla.

[73] Assignee: United Technologies Corporation, Hartford, Conn.

[21] Appl. No.: 354,533

[22] Filed: May 19, 1989

[51] Int. Cl.$^5$ ................................................ F02C 9/08
[52] U.S. Cl. ........................... 364/431.020; 60/39.282; 244/182
[58] Field of Search .............. 364/442, 431.01, 431.02, 364/431.03, 431.04, 431.05, 427, 428, 510; 60/39.282; 244/182

[56] References Cited

U.S. PATENT DOCUMENTS

| | | | |
|---|---|---|---|
| 4,286,324 | 8/1981 | Ingram | 364/442 |
| 4,344,141 | 8/1982 | Yates | 364/442 |
| 4,423,593 | 1/1984 | Zagranski et al. | 60/39.161 |
| 4,488,236 | 12/1984 | Morrison et al. | 364/442 |
| 4,522,026 | 6/1985 | Peterson et al. | 60/39.282 |
| 4,716,531 | 12/1987 | Saunders et al. | 364/431.02 |
| 4,716,719 | 1/1988 | Takahashi et al. | 60/39.281 |

FOREIGN PATENT DOCUMENTS 2144244A 2/1985 United Kingdom .

*Primary Examiner*—Parshotam S. Lall
*Assistant Examiner*—Tyrone Queen

[57] ABSTRACT

A helicopter engine speed reference (66) is increased (113, 103–105) in response to heavy rotor loading (108). The reference speed is faded up (113, 104) at a rather rapid rate to 107% of rated speed (114). After a fixed time interval (118), reduced rotor loading (119) will cause the reference speed to be faded down slowly (120, 103–105) to rated speed (121). If torque exceeds 111% of rated torque (117), the reference speed is similarly faded down (120, 103–105).

3 Claims, 2 Drawing Sheets

HELICOPTER, HIGH ROTOR LOAD SPEED ENHANCEMENT

This invention was made with Government support under a contract awarded by the Department of the Army. The Government has certain rights in this invention.

TECHNICAL FIELD

This invention relates to helicopter fuel controls, and more particularly to providing enhanced engine speed during heavy rotor load maneuvers.

BACKGROUND ART

In United Kingdom Patent No. 2,144,244 B, positive longitudinal pitch rate is used to indicate high rotor load factors, such as during high speed highly banked turns. At high speed, some shaping of pitch rate is accomplished to provide a signal to be added to the normal engine reference speed signal, such as to command a higher engine speed. In said patent, it is also suggested that a signal derived by shaping the output of a vertical body axis accelerometer could also be used to enhance engine speed during heavy rotor load maneuvers, either alone or in conjunction with the shaped pitch rate signal. In said patent, it is stated that increasing the engine speed reference provides higher rotor thrust while preserving rotor stall and control margins during high rotor load maneuvers.

It has been found that using a shaped signal of the event in question tends to abruptly reduce the engine speed near the end of the high rotor load maneuver, inducing yaw transients which are highly undesirable at precisely the point where stability is desired, adding significantly to pilot workload. Further, using such a shaped signal tends to cause the engine to achieve speeds in excess of reference speeds under heavy load, thus causing a tendency toward exceeding maximum permissible torque in the engine. Any advantage that the pilot workload may gain because of the speed enhancement is diminished by the need to constantly monitor the torque, providing load-relaxing inputs to the blade pitch controls, or beeping speed down during the maneuver. All of this tends to increase instability and increase pilot workload and therefore is unfavorable.

DISCLOSURE OF INVENTION

Objects of the invention include engine speed enhancement during heavy rotor load maneuvering of a helicopter with minimal end-of-maneuver yaw transients, reduced pilot workload, and maintaining engine torque below maximum permissible torque levels.

According to the invention, the occurrence of helicopter rotor loading in excess of a threshold magnitude induces a fade-up of engine set speed above rated speed, then when load factor is again reduced below a second value, less than said threshold, the engine reference speed is faded down to rated speed.

According further to the present invention, once fade-up of engine reference speed has commenced, the increased reference speed will be maintained for a minimum period of time, to allow completion of maneuvers, before determining whether a reduced load factor should cause commencement of fade-down of the reference speed.

In accordance further with the invention, whenever engine reference speed enhancement is utilized as a consequence of induced rotor loading, engine torque is continuously monitored, and if it approaches maximum permissible engine torque the engine reference speed is faded down toward rated speed.

In still further accord with the present invention, the response to heavy rotor loading above a threshold magnitude, the engine reference speed is faded up at a first rate to achieve a desired speed in excess of rated speed, and in response to reduced rotor loading after a period of time, engine speed is faded down at a much slower rate than fade up, so as to return to rated speed over a period of several seconds.

The present invention provides improved high rotor load maneuvering, with low pilot workload, and significantly reduced yaw transients in the final phases of maneuvering. The invention permits high rotor load maneuvers with speed enhancement while mitigating the possibility of exceeding maximum permissible engine torque levels.

The foregoing and other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
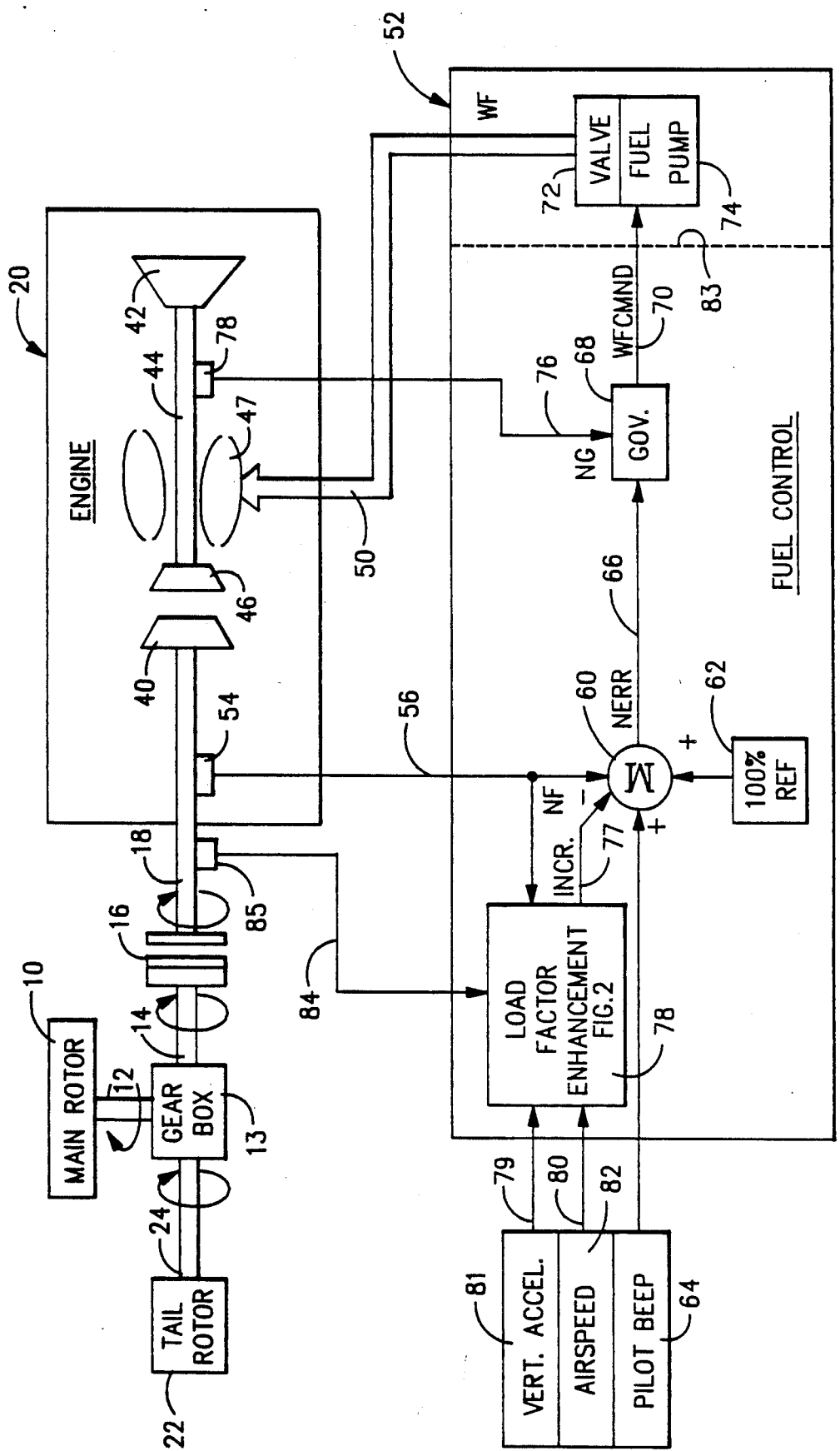
FIG. 1 is a simplified schematic diagram of a helicopter drive system and engine fuel control, incorporating precepts of the present invention.

Referring now to FIG. 1, a main rotor 10 is connected through a shaft 12 to a gear box 13 which is driven by a shaft 14 through an overrunning clutch 16, which engages an output shaft 18 of an engine 20 when the engine speed equals or exceeds the rotor speed. The gear box 13 also drives a tail rotor 22 through a shaft 24 so that the main rotor 10 and the tail rotor 22 are always driven at speeds bearing a fixed relationship to each other, such as the tail rotor rotating about five times faster than the main rotor.

The engine 20 may typically comprise a free turbine gas engine in which the output shaft 18 is driven by a free turbine 40, which is in turn driven by gases from a gas generator including a turbocompressor having a compressor 42 connected by a shaft 44 to a compressor-driving turbine 46, and a burner section 47 to which fuel is applied by fuel lines 50 from a fuel control 52. The fuel control 52 typically tries to provide the correct rate of fuel (WF) in the fuel inlet lines 50 so as to maintain a desired engine speed (NF) as determined by a tachometer 54 which measures the speed of the free turbine 40 (such as on the output shaft 18) to provide a turbine speed indicating signal on a line 56 to a summing junction 60. The other inputs to the summing junction 60 comprise the reference speed, which typically is a reference value indicative of 100% rated speed derived from a source 62, together with any pilot-desired variant therein as determined by a signal from the pilot's engine speed beeper 64. The output of the summing junction 60 is a speed error signal on a line 66 which is applied to the governor portion 68 of the fuel control, the output of which is a commanded fuel rate (WFCMND) on a line 70. This is applied to the metering valve 72 so as to cause the correct amount of fuel from a fuel pump 74 to be applied to the fuel inlet lines 50, all in the well known way. Within the governor 68, a signal indicative of gas generator speed (NG) on a line 76 may be taken from a tachometer 78 responsive to the gas generator spool including the compressor 42, the shaft 44 and the turbine 46.

Everything described thus far is in accordance with the skill of the art and forms no part of the present invention.

In accordance with the invention, the total reference speed from which the free turbine speed NF is subtracted, so as to provide the speed error signal NERR, includes an increment provided on a line 77 by a load factor enhancement portion 78 of the electronic fuel control. The load factor enhancement portion 78 is responsive to signals on lines 79 and 80 respectively indicative of vertical acceleration, as determined from a vertical accelerometer 81, and airspeed, as provided by an airspeed sensor 82. The load factor enhancement portion 78 is also responsive to a torque signal on a line 84 from a standard, known torque sensor 85, which indicates the torque provided to the rotors by the engine. The load factor enhancement portion 78 is deemed to be the software required to perform the load factor enhancement function in accordance with the present invention, in a fuel control in which the calculations are determined digitally, such as all that portion of the fuel control 52 shown to the left of the dotted line 83.

Figure 2:
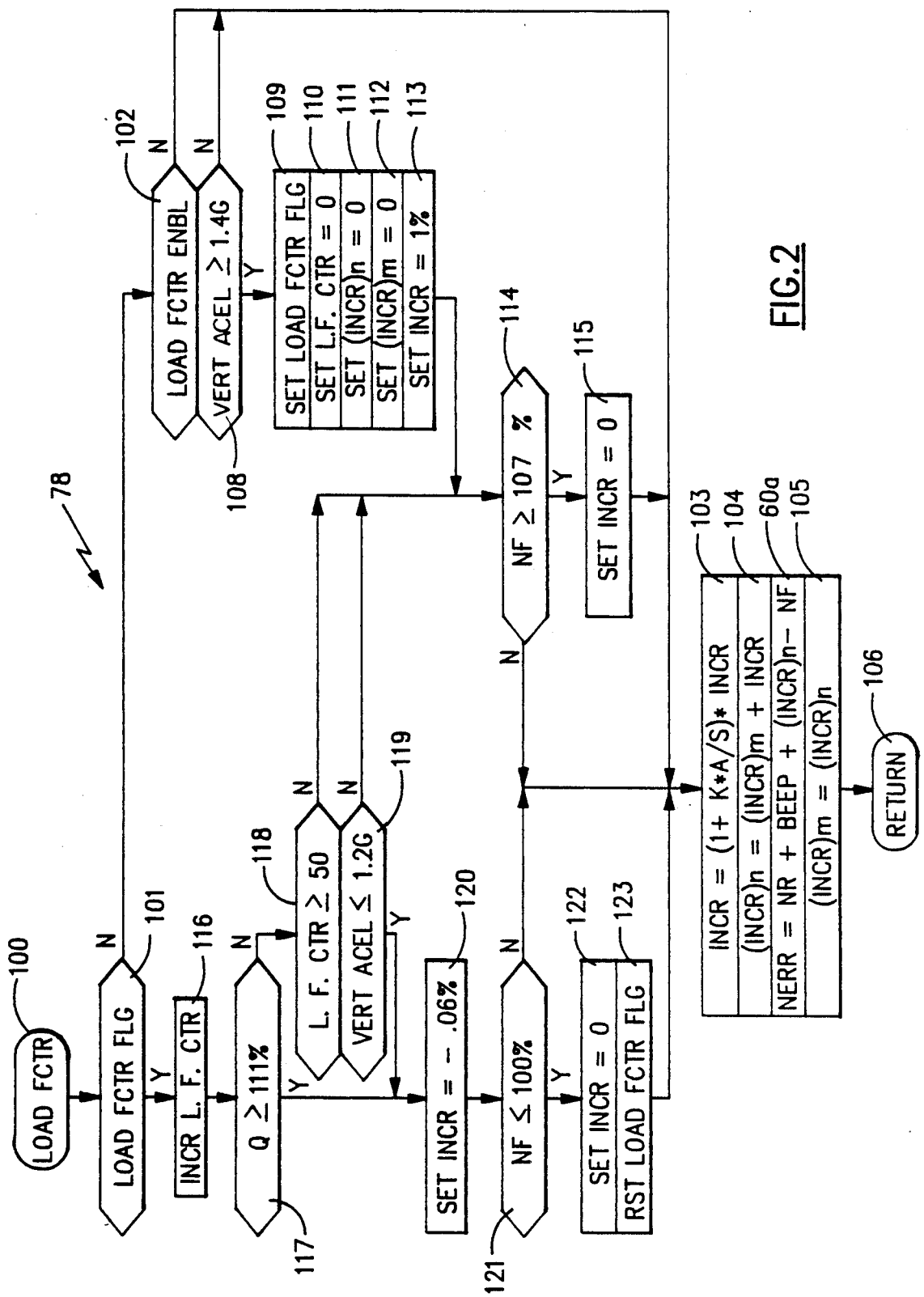
FIG. 2 is a simplified logic flow diagram of a routine for providing engine speed enhancement according to the invention in a digital fuel control.

Referring now to FIG. 2, a load factor routine is entered through an entry point 100 and a first test 101 determines whether load factor enhancement is in progress or not. If not, a load factor flag will not have been set, and a negative result of test 101 will reach a test 102 to determine whether a load factor enable switch (on the pilot's console) has been set or not. If not, a negative result of test 102 will reach a step 103 in which an increment (as is described more fully hereinafter) can be modified as a function of airspeed (as described hereinafter), if desired, followed by a step 104 in which an accumulated increment for the current cycle (INCR) is upgraded by having an increment INCR added to the accumulated increment of the next prior cycle (INCR)m. Then, a step 60a, provides the summation shown by the summing block 60 in FIG. 1 and the accumulated increment is updated in a step 105. And then, other portions of the fuel control computations can be reached through a return point 104.

On the other hand, if load factor has been enabled but is not in process, a positive result of test 102 will reach a test 108 to determine if vertical acceleration is equal to or exceeds 1.4 times gravity. If not, this indicates that an excessive load maneuver, sufficiently severe to warrant load factor enhancement of engine speed, is not being performed, so the program will exit as before. However, when a heavy rotor loading maneuver (such as a sharp angle turn) is being performed, and the vertical acceleration in the airframe reference, which is that parallel to the shaft of the main rotor, equals or exceeds 1.4 times that of gravity, then an affirmative result of the test 108 will reach a step 109 which sets a load factor flag, indicating that load factor enhancement of engine speed is in process, and a series of steps 110-112 in which certain factors are initialized to zero. In the step 110, a load factor counter, which keeps track of the initial time period of each load factor enhancement mode of operation, is initialized to zero; in the step 111, an accumulated value of increments for use in the current iteration of the program (INCR)n is initialized to zero; in a step 112 the accumulated value of increments in the prior cycle (INCR)m is initialized to zero. Then in a step 113, the initial increment is set at 1% of rated speed. Setting the increment at a value of 1% of rated speed will cause the accumulated increment to increase by 1% in each cycle such that, for a machine which iteratively repeats its cycle once every 200 milliseconds, will cause the speed increment to be increased at a rate of 5% per second, during excessive load maneuvers. Following the step 113, a test 114 is made to determine whether the engine speed has reached a maximum speed of 107% or more. If it has, a step 115 will cause the increment to be reset to zero, so that no further increase in the accumulated increments will occur in successive cycles. This will hold the set speed at 107% or slightly higher if it initiated when it was not at exactly 100% (assuming that the pilot does not beep it to some other setting). On the other hand, in the initial passes through the program, the engine speed will not have reached 107%, so a negative result of test 114 will reach the series of steps 103-105.

In the step 103, which may or may not be used as desired, provision is made to alter the increment in some fashion as a function of airspeed. As shown in FIG. 2, the increment can be zero if K is equal to zero or it can be some positive or negative function of airspeed which can be multiplied by the increment so as to adjust the increment. On the other hand, the factor in parentheses in step 103 could be added to the increment. Thus, flexibility can be provided so as to cause the rate of increasing or decreasing the reference speed during high load maneuvers in a fashion which can be made to be a variety of functions of airspeed. In a typical case, K may be zero so step 103 may be ignored, in such case.

In the step 104, the current value of an accumulated increment factor to be added into the set speed is determined by adding the accumulated increment factor of the prior cycle of iteration to the current value of the increment established in either step 113 or step 115. Then, in step 60a, the speed error signal (NERR) is formed as the sum of the reference speed (from 62 in FIG. 1), any beep increment from the pilot (64 FIG. 1), the accumulated increment value for this cycle formed in step 104, minus the engine speed (NF) provided on line 56 in FIG. 1. Any conditioning or filtering of the signals utilized in step 60a are deemed to be provided in other subroutines, known to the art, or by any other suitable means. In step 105, the accumulated increment value from the prior cycle is updated to equal that for this cycle, and then the routine is exited through the return point 106.

The process described with respect to the steps 109-113 occur only during the first cycle of load factor enhancement. In the second and subsequent cycles, the load factor routine is entered through the entry point 100 and the test 101 will now yield an affirmative result, reaching a step 116 in which the load factor counter is incremented. The load factor counter is allowed to count up to 50, which in a 200 millisecond machine is equal to 10 seconds, as described hereinafter. This assures a minimum period of 10 seconds in which load factor enhancement will continue, before tests are made to see if it should discontinue. However, in order to avoid the necessity of the pilot having to visually check for torque exceeding maximum permissible torque levels, such as 111% of rated torque, a test 117 continuously tests, in each cycle, to see whether torque has exceeded the maximum torque or not. Assume for the time being that such is not the case. Thus, a negative result of test 117 will reach a test 118 wherein the load factor counter is tested to determine whether it has reached 50 or not. In initial passes through the subroutine, a negative result of test 118 will reach the test 114 to determine if engine speed has reached 107% of rated speed or not. In the first few passes it will not, so that a negative result of test 114 will reach the steps 103-105 where the accumulated increment is updated, the speed error is calculated and then the program is exited, as described hereinbefore. In the third and successive passes, generally, an affirmative result of test 101 will cause the counter to be incremented in step 116; a negative test of 117 will reach test 118, which will be negative; a negative result test of 114 will reach the steps 103-105 to keep increasing the set speed as described hereinbefore. In this manner, the load factor enhancement increment to the set speed is faded up (5%/sec.).

Assuming everything is tracking properly, by increasing the accumulated increment one percent in each cycle of the routine of FIG. 2, after 7 cycles, the increment should have accumulated to seven percent of rated speed. But this is subject to system lag. By the 8th or 9th cycle, the engine speed will likely have reached 107%, unless it is excessively loaded. It can be assumed that the engine speed will reach 107% at some point in time, in which case an affirmative result of the test 114 will reach the step 115 to cause the increment to be set to zero. Thus, in the step 104, the current increment (INCR)n will be rendered equal to the former increment (INCR)m because the increment value INCR is zero. That would mean, under ideal, steady state conditions (which are not likely to occur), that the error signal established in step 60a could be the same cycle after cycle, once the engine has reached 107% of rated speed.

After 50 cycles, an affirmative result of test 118 will reach a test 119 in which it is determined whether the vertical acceleration has subsided slightly to 1.2 times the acceleration of gravity. As the maneuver tends toward completion, the loading will be reduced, and the step 119 senses when the loading begins to be reduced. Another feature of the present invention is that the load factor enhancement of engine speed is faded down slowly at the end of a high load maneuver; this is achieved by an affirmative result of test 119 reaching a step 120 in which the increment is set at minus one tenth of a percent, which will yield a fade down rate of three tenths of one percent (0.3%) of rated engine speed per second (in a 200 millisecond machine). Then a test 121 (which is the complement of the test 114) determines whether engine speed has been reduced to rated engine speed or not. If not, a negative result of test 121 will reach the steps 103-105 in which operation is as before, except the step 104 will now result in lowering the accumulated increment for the current cycle because the increment factor is now negative. During fade down, progression will typically be an affirmative result from step 101 leading to a negative result of test 117, an affirmative result of test 118 and an affirmative result of test 119, a redundant performing of the step 120, and a negative result of test 121. In a normal fade down, the engine speed will eventually be reduced to rated speed, so that the result of test 121 will be affirmative, leading to a step 122 which will set the increment to zero (the complement of step 115) and a step 123 which resets the load factor flag, indicating that performance of load factor enhancement of engine speed during this particular high load maneuver has ended.

Once the load factor flag has been set, whether during the fade up, during steady application of 107% of rated speed or during the fade down, each pass through the routine of FIG. 2 reaches the test 117 to determine if engine torque has reached maximum torque, such as 111% of rated torque. If it has, then an affirmative result of step 117 will ensure that the increment is set to a negative amount in step 120 so that the enhancement will be faded down, without regard to whether fade up, or steady state at 107%, or fade down had previously been in progress. It can be assumed that several passes may be made before engine torque is brought below 111%, after which a negative result of step 117 can reach the tests 118 and either 119, 114, and/or 121 during fade up, steady state operation at 107% of rated speed, or fade down. If such continued operation in fade up or steady state again causes the torque to exceed maximum torque, then test 117 will again be affirmative and commence fade down automatically. The test 117 and resulting fade down overcomes the need for a pilot to concern himself with exceeding maximum torque during a high load maneuver wherein load factor enhancement of engine speed is being employed. This is another feature of the present invention. Of course, the governor portion 68 of the fuel control prevents overspeed and operation at excessive temperatures, as is well known. If desired, an affirmative result of test 117, indicating maximum torque, could set a different negative increment to fade down more quickly, in a step parallel to step 120; in such case step 120 would be reached only from test 119.

A first aspect of the present invention is, instead of using a shaped function of some phenomenon (positive longitudinal pitch rate, vertical acceleration), the present invention responds to high load factors by rapidly fading up to a maximum engine speed.

Another aspect of the present invention is maintaining increased engine speed for a threshold period of time to ensure that maneuvers can be completed before the engine is allowed to droop.

A further aspect of the present invention is utilizing a relatively slow fade down when completing the maneuver as indicated by a reduction in the load factor.

Another feature of the invention is constantly monitoring for excessive torque and automatically fading the engine speed down in response to high engine torque.

The exemplary embodiment herein is described as being implemented within a program of a digital fuel control. The particular characteristics of the fuel control are irrelevant, so long as it is of the type that uses a turbine reference speed to control fuel flow to the engine. On the other hand, if a different sort of basic reference were used for the engine of the helicopter, the precepts of the present invention may be readily adapted to accommodate the same. The manner in which the fuel control controls fuel flow is irrelevant to the present invention. The invention is readily implementable in an existing digital fuel control which has the capacity for the algorithms of this invention and the remaining algorithms of the aforementioned patent. The invention is readily implemented for use with any fuel control, having only the NF SET function thereof being altered by the invention. It may be accomplished by dedicated digital hardware or by analog hardware if desired. In such case, it may be implemented in a different fashion from that disclosed herein in accordance with the general equivalence between software as shown herein and dedicated digital hardware and software, which equivalence is described (in a different example) in U.S. Pat. No. 4,294,162. Of course, the present invention may be implemented within a digital automatic flight control system computer such as that shown in U.S. Pat. No. 4,270,168, or otherwise, in which case the fuel controlling signal processing means of the invention would encompass some of said flight control system. All of the cycle times, counts, and the like herein may of course be adjusted to suit any implementation and utilization of the invention. All of the foregoing is irrelevant to the invention, it suffices to select the aspects thereof which are desired to be utilized and to provide suitable signal processing to achieve the desired result in accordance with the invention, in a manner suited to the intended implementation or aircraft use.

Similarly, although the invention has been shown and described with respect to exemplary embodiments thereof, it should be understood by those skilled in the art that the foregoing and various other changes, omissions and additions may be made therein and thereto, without departing from the spirit and the scope of the invention.

We claim:

1. A control for a helicopter engine having a free turbine for normally driving the helicopter rotors at a rated speed, comprising:

means for providing an actual speed signal indicative of the rotary speed of the free turbine;

fuel valve means for metering fuel to said engine at a rate determined by a fuel command signal applied thereto; and fuel controlling signal processing means connected for response to said actual speed signal, for providing a reference speed signal indicative of desired rotary speed of the free turbine which reference speed signal normally indicates said rated speed and which reference speed signal alternatively indicates a speed greater than said rated speed in response to high rotor load maneuvers, for providing, in response to said actual speed signal and said reference speed signal, a speed error signal indicative of the difference in turbine speed indicated by said actual speed signal and said reference speed signal, and for providing said fuel command signal to said fuel valve means indicative of a desired fuel flow rate as a function of said speed error signal, characterized by:

a vertical accelerometer for providing a vertical acceleration signal indicative of acceleration of the helicopter in a direction substantially parallel to the rotary axis of the main rotor; and said fuel controlling signal processing means comprising means responsive to said vertical acceleration signal indicating positive vertical acceleration in excess of a threshold magnitude for providing successively greater speed increasing increments to said reference speed signal to reach a predetermined reference speed signal indicating a reference speed in excess of rated speed, for providing said predetermined reference speed signal for at least a predetermined period of time, and responsive to the lapse of said predetermined time and to said vertical acceleration signal indicating a positive vertical acceleration with is less by a given finite amount than said threshold magnitude for providing successively greater speed decreasing increments to said reference speed signal to reach a reference speed signal indicative of rated speed.

2. A control for a helicopter engine having a free turbine for normally driving the helicopter rotors at a rated speed, comprising:

means for providing an actual speed signal indicative of the rotary speed of the free turbine;

fuel valve means for metering fuel to said engine at a rate determined by a fuel command signal applied thereto; and fuel controlling signal processing means connected for response to said actual speed signal, for providing a reference speed signal indicative of desired rotary speed of the free turbine, which reference speed signal normally indicates said rated speed and which reference speed signal alternatively indicates a speed greater than said rated speed in response to high rotor load maneuvers, for providing, in response to said actual speed signal and said reference speed signal, a speed error signal indicative of the difference in turbine speed indicated by said actual speed signal and said reference speed signal, and for providing said fuel command signal to said fuel valve means indicative of a desired fuel flow rate as a function of said speed error signal, characterized by:

a vertical accelerometer for providing a vertical acceleration signal indicative of acceleration of the helicopter in a direction substantially parallel to the rotary axis of the main rotor;

torque sensing means for sensing the torque applied by said turbine to said rotors and for providing a torque signal indicative thereof; and said fuel controlling signal processing means comprising means responsive to said vertical acceleration signal indicating positive vertical acceleration in excess of a threshold magnitude for providing speed increasing increments to said reference speed signal to reach a predetermined reference speed signal indicating a reference speed in excess of rated speed, and responsive, alternatively, to said vertical acceleration signal indicating a positive vertical acceleration which is less than said threshold magnitude or to said torque signal indicating torque approaching maximum permissible turbine torque, for providing successively greater speed decreasing increments to said reference speed signal to reach a reference speed signal indicative of rated speed.

3. A control for a helicopter engine having a free turbine for normally driving the helicopter rotors at a rated speed, comprising:

means for providing an actual speed signal indicative of the rotary speed of the free turbine;

fuel valve means for metering fuel to said engine at a rate determined by a fuel command signal applied thereto; and fuel controlling signal processing means connected for response to said actual speed signal, for providing a reference speed signal indicative of desired rotary speed of the free turbine which reference speed signal normally indicates said rated speed and which reference speed signal alternatively indicates a speed greater than said rated speed in response to high rotor load maneuvers, for providing, in response to said actual speed signal and said reference speed signal, a speed error signal indicative of the difference in turbine speed indicated by said actual speed signal and said reference speed signal, and for providing said fuel command signal to said fuel valve means indicative of a desired fuel flow rate as a function of said speed error signal, characterized by:

a vertical accelerometer for providing a vertical acceleration signal indicative of acceleration of the helicopter in a direction substantially parallel to the rotary axis of the main rotor; and said fuel controlling signal processing means comprising means responsive to said vertical acceleration signal indicating positive vertical acceleration in excess of a threshold magnitude for providing successively greater speed increasing increments to said reference speed signal to reach, within a first period of time, a predetermined reference speed signal indicative of a reference speed in excess of rated speed, and responsive to said vertical acceleration signal indicating a positive vertical acceleration which is less by a given finite amount than said threshold magnitude, for providing successively greater speed decreasing increments to said reference speed signal to reach a reference speed signal indicative of rated speed within a second period of time which is at least several times larger than said first period of time.

* * * * *